United States Patent
Zhu et al.

(10) Patent No.: US 10,355,537 B2
(45) Date of Patent: Jul. 16, 2019

(54) METHOD FOR ADJUSTING MAGNETIC PERMEABILITY OF ELECTRICAL STEEL

(71) Applicant: FORD GLOBAL TECHNOLOGIES, LLC, Dearborn, MI (US)

(72) Inventors: Leyi Zhu, Novi, MI (US); Feng Liang, Troy, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 161 days.

(21) Appl. No.: 15/470,115

(22) Filed: Mar. 27, 2017

(65) Prior Publication Data

US 2018/0278100 A1  Sep. 27, 2018

(51) Int. Cl.
| | | |
|---|---|---|
| *H02K 1/02* | (2006.01) | |
| *H02K 1/27* | (2006.01) | |
| *H02K 15/03* | (2006.01) | |
| *B32B 15/01* | (2006.01) | |

(52) U.S. Cl.
CPC ............ *H02K 1/02* (2013.01); *B32B 15/011* (2013.01); *H02K 1/2766* (2013.01); *H02K 15/03* (2013.01); *H02K 2213/03* (2013.01)

(58) Field of Classification Search
CPC .. H02K 1/00; H02K 1/02; H02K 1/22; H02K 1/24; H02K 1/246; H02K 1/27; H02K 1/274; H02K 1/276; H02K 1/2766; H02K 1/278; H02K 21/00; H02K 21/08; B32B 15/00; B32B 15/01; B32B 15/011; B22F 7/00; B22F 7/06; B22F 7/064
See application file for complete search history.

(56) References Cited

U.S. PATENT DOCUMENTS

| | | | |
|---|---|---|---|
| 3,438,229 A | 4/1969 | Bartlett | |
| 4,486,679 A | 12/1984 | Jones | |
| 4,916,346 A * | 4/1990 | Kliman | .................. H02K 1/246 |
| | | | 310/156.51 |
| 6,717,314 B2 | 4/2004 | Horst et al. | |
| 6,889,419 B2 * | 5/2005 | Reiter, Jr. | ............... B22F 7/064 |
| | | | 29/596 |
| 6,891,297 B2 | 5/2005 | Shimada et al. | |
| 6,891,298 B2 | 5/2005 | Gary | |
| 6,946,766 B2 | 9/2005 | Gary et al. | |
| 7,233,090 B2 | 6/2007 | Evans et al. | |
| 7,795,772 B2 | 9/2010 | Arimitsu et al. | |
| 8,102,091 B2 | 1/2012 | Ionel | |
| 8,247,940 B2 | 8/2012 | Hino et al. | |
| 8,368,273 B2 | 2/2013 | Hino et al. | |
| 8,508,092 B2 | 8/2013 | Ankeney et al. | |

(Continued)

FOREIGN PATENT DOCUMENTS

| | | | |
|---|---|---|---|
| JP | 63144743 | * | 6/1988 |
| JP | 2004119775 A | | 4/2004 |
| WO | 2015/172916 A1 | | 11/2015 |

*Primary Examiner* — Tran N Nguyen
(74) *Attorney, Agent, or Firm* — David B. Kelley; Brooks Kushman P.C.

(57) ABSTRACT

A core lamination includes a first region defined by a ferromagnetic electrical steel substrate having a predefined magnetic permeability and a second region having a lower magnetic permeability than the first region, the second region defined by the substrate selectively overcoated with at least one non-ferrous element from Period 2-5, or a combination thereof.

20 Claims, 8 Drawing Sheets

(56) References Cited

U.S. PATENT DOCUMENTS

| | | |
|---|---|---|
| 8,536,748 B2 | 9/2013 | Liang et al. |
| 8,754,560 B2 | 6/2014 | Ley et al. |
| 8,766,503 B2 | 7/2014 | Kagami et al. |
| 8,890,385 B2 | 11/2014 | Sano et al. |
| 9,024,499 B2 | 5/2015 | Nakada |
| 2004/0150282 A1 | 8/2004 | Murakami et al. |
| 2007/0108169 A1 | 5/2007 | Shimada et al. |
| 2007/0252467 A1 | 11/2007 | Hoemann et al. |
| 2010/0154504 A1 | 6/2010 | Cunha et al. |
| 2010/0225431 A1 | 9/2010 | Kadota et al. |
| 2012/0200186 A1 | 8/2012 | Sano et al. |
| 2012/0200187 A1 | 8/2012 | Sano et al. |
| 2012/0205573 A1 | 8/2012 | Komuro et al. |
| 2012/0274160 A1 | 11/2012 | Hino et al. |
| 2013/0169094 A1 | 7/2013 | Lee et al. |
| 2013/0169101 A1 | 7/2013 | Deng et al. |
| 2013/0307363 A1 | 11/2013 | Sano et al. |
| 2013/0320798 A1 | 12/2013 | Islam et al. |
| 2014/0084910 A1 | 3/2014 | Makino |
| 2014/0091664 A1 | 4/2014 | Aoyama |
| 2014/0217849 A1 | 8/2014 | Soma et al. |
| 2014/0246938 A1 | 9/2014 | Lillington |
| 2014/0283373 A1 | 9/2014 | Melfi et al. |
| 2015/0015093 A1 | 1/2015 | Gontermann et al. |
| 2015/0162788 A1* | 6/2015 | Tsai .............. H02K 1/246 310/46 |
| 2015/0270752 A1 | 9/2015 | Tanaka et al. |
| 2015/0372572 A1 | 12/2015 | Hashimoto et al. |
| 2015/0372577 A1 | 12/2015 | Haussmann et al. |

\* cited by examiner

METHOD FOR ADJUSTING MAGNETIC PERMEABILITY OF ELECTRICAL STEEL

TECHNICAL FIELD

The disclosure relates to a method of selectively adjusting magnetic permeability of an electric steel, a steel lamination, electric machine rotor, stator, stationary applications of electrical steels such as inductor cores, transformers, and the like.

BACKGROUND

Torque is generated by electric machines. Magnetic fields are generated in electric machines for the torque generation. Field shaping regions are used to improve the direction and magnitude of the magnetic fields.

SUMMARY

A core lamination is disclosed. The lamination includes a first region defined by a ferromagnetic electrical steel substrate having a predefined magnetic permeability. In addition to the first region, the lamination includes a second region having a lower magnetic permeability than the first region. The second region is defined by the substrate selectively overcoated with at least one non-ferrous element from Period 2-5, or a combination thereof. The substrate in the second region may include a non-ferromagnetic austenite phase of the electrical steel. The at least one non-ferrous element from Period 2, 3, 4 may be diffused into the non-ferromagnetic austenite phase to stabilize the non-ferromagnetic phase. The at least one non-ferrous element may form an alloy with the substrate in the second region. The second region may include manganese, nickel, aluminum, silicon, carbon, sulfur, germanium, chromium, molybdenum, or an alloy thereof. The at least one non-ferrous element may form non-ferromagnetic oxides, carbides, or nitrides in the second region. The lamination may be a rotor lamination, stator lamination, inductor lamination, or a transformer lamination.

In a different embodiment, a method of adjusting magnetic permeability of a core lamination is disclosed. The method includes inducing a phase transformation of an electrical steel lamination having a predefined magnetic permeability to generate a non-ferromagnetic austenite phase. The method further includes shielding a first region of the lamination while selectively applying at least one non-ferrous element from Period 4, 5, or both to a second region of the lamination. The method includes diffusing the at least one element into the second region of the lamination such that the second region remains in the non-ferromagnetic austenite phase while the first region regains its ferromagnetic properties after the lamination is cooled to a room temperature. The second region may include manganese, nickel, chromium, molybdenum, or an alloy thereof. The method may further include applying the at least one non-ferrous element from Period 4, 5, or both on the lamination surface before diffusing the at least one element into the second region. The second region may include at least two discreet portions, each portion having the same shape, dimensions, or both. The method may further include applying an insulation coating over the first and second regions.

In an alternative embodiment, a method of suppressing magnetic permeability of a core lamination is disclosed. The method includes shielding a first region of the lamination while selectively applying at least one non-ferrous element from Period 2, 3, or 4 to a second region of the lamination. The method further includes diffusing the at least one element into the second region such that a substrate of the lamination forms and maintains a material, having lower magnetic permeability than the first region, with the at least one non-ferrous element in the second region. The second region may include manganese, nickel, aluminum, silicon, carbon, sulfur, germanium, chromium, or an alloy thereof. The material may be an oxide, carbide, nitrite, or an alloy. The method may further include ion-implanting the at least one element into the second region. The second region may define one or more flux barriers of a rotor or stator core lamination.

In a yet alternative embodiment, a method of adjusting magnetic permeability of an electrical steel sheet or coil is disclosed. The method includes shielding a first region of the steel sheet or coil while selectively applying at least one non-ferrous element from Period 2-5 to a second region of the steel sheet or coil, the first and second regions having a same predetermined magnetic permeability. The method further includes diffusing the at least one element into the second region such that the magnetic permeability of the second region is lowered and the second region maintains the lower magnetic permeability than the first region. The method further includes inducing a phase transformation of the second region to generate and maintain a non-ferromagnetic austenite phase in the second region while maintaining a ferromagnetic phase in the first region. The method may also include forming an alloy with the at least one non-ferrous element in the second region, the alloy having a lower magnetic permeability than the predetermined magnetic permeability.

DETAILED DESCRIPTION

Figure 1:
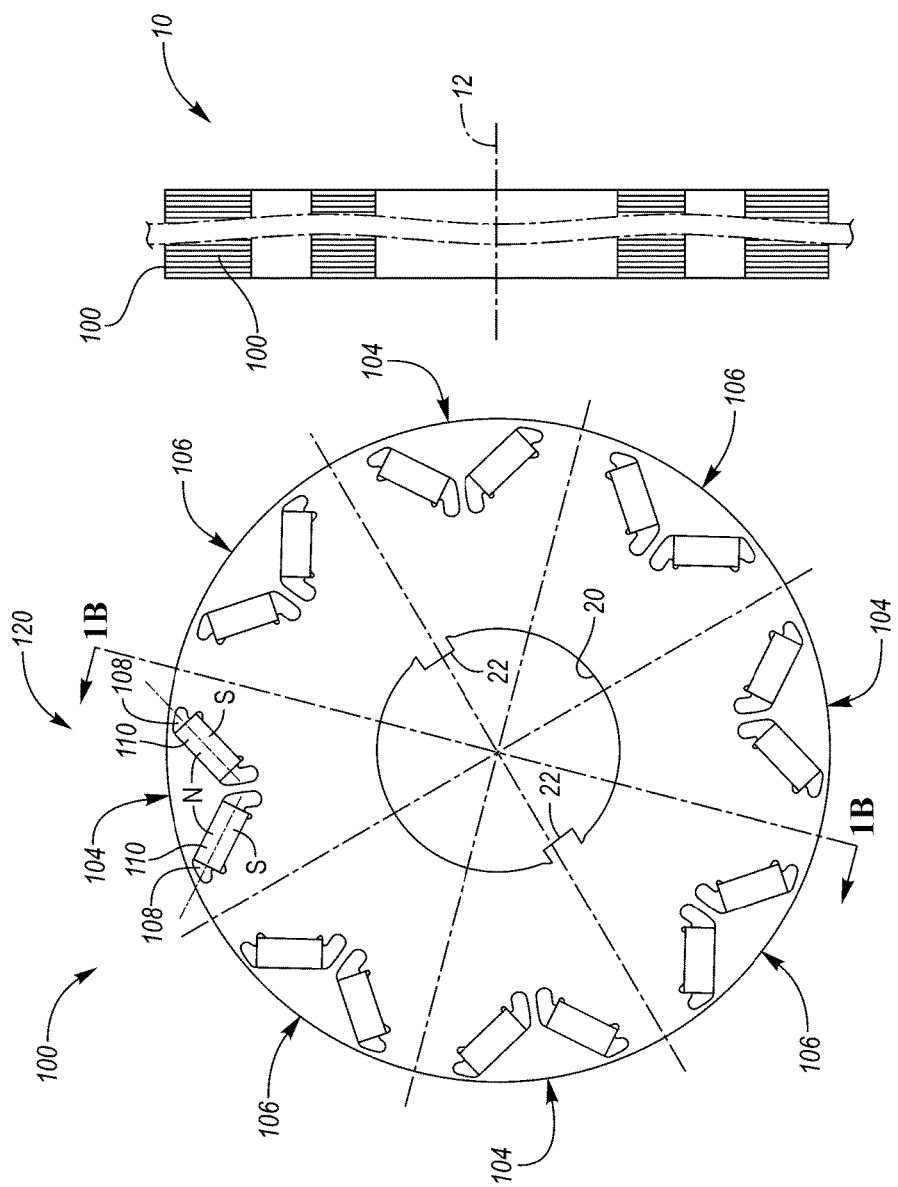
FIG. 1A is a plan view of an example permanent magnet synchronous rotor lamination.
FIG. 1B is a side view of example rotor laminations stacked to form a rotor or rotor core.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Due to the progressively stringent performance and cost requirements of electrified vehicles, there is a heightened need for compact, highly efficient and high-performance electric machines and high-performance electrical steel used in motor/generator cores. Electric machines are used to generate torque using a variety of methods. Some electric machines use permanent magnets to generate rotor magnetic fields. Other electric machines may use induced rotor and stator magnetic fields or wound rotor electromagnets. In any case, the direction and magnitude of the fields ensure proper torque generation. The magnetic fields may be shaped by a variety of methods.

One method which may be used to shape magnetic fields in a desirable way is providing low magnetic permeability regions in a rotor and/or stator lamination. The one or more low magnetic permeability regions impede magnetic flux and redirect the flux to preferred directions.

Yet, in a typical motor/generator core manufacturing process, rotor or stator lamination cores are punched from an electrical steel sheet having homogeneous chemical composition and magnetic properties which results in identical magnetic property characteristics within the entire rotor or stator lamination core. Thus, in the typical laminations, the shape of the magnetic fields may not be optimized and the flux may not be redirected to preferred directions.

Therefore, it would be desirable to provide a rotor or stator lamination core having regions exhibiting different properties, especially different magnetic permeability to optimize flux leakage, increase torque density, and optimize performance of the cores. The regions may be positioned to eliminate known and undesired fluxes or redirect those fluxes fruitfully.

As was mentioned above, a conventional method of producing lamination cores includes processing a uniform iron alloy through hot rolling, intermediate annealing, cold rolling and final annealing of the alloy into thin electrical steel sheets with homogenous chemical composition. The steel sheets are die punched and stacked together to form a stator or rotor core. The lamination cores have homogenous and identical magnetic properties throughout the entire core.

In contrast to the conventional method, a process of producing a rotor or stator lamination, lamination cores, and electrical steel sheets or coils having regions of different magnetic permeability is disclosed. As referenced herein, the substrate may refer to a material of a lamination, a lamination core, or an electrical steel sheet or coil to be used for different applications. For example, while the disclosure uses rotor and stator as examples, the method is likewise applicable to stationary applications of electrical steels such as inductor cores, transformers, and the like.

In one or more embodiments, the method utilizes the difference in magnetic permeability of different phases of the electrical steel or other substrate triggered by phase transition of the substrate. For example, electrical steel undergoes phase transition from ferromagnetic to non-ferromagnetic at a certain temperature, known as the phase transition temperature. Upon the electrical steel cooling down below the phase transition temperature, another phase transformation occurs, and the substrate regains its ferromagnetic properties. The method alters one or more portions of the substrate after the phase transition temperature is reached and before the room temperature is reached in such a way that the portions are stabilized in their non-ferromagnetic phase at room temperature. As a result, the altered regions remain in their non-ferromagnetic phase while other regions return to the ferromagnetic phase.

In one or more embodiments, a method of locally modifying magnetic permeability of rotor or stator laminations is disclosed. Magnetic permeability is a proportionality that exists between magnetic induction and magnetic field intensity. The method utilizes phase transformation of the lamination substrate from a phase having high magnetic permeability of at least $4\pi \times 10^{-7}$ H/m to α phase having low magnetic permeability. The high magnetic permeability phase is a ferrite phase or a phase. The phase having low magnetic permeability is a non-ferromagnetic austenite phase or γ phase. The low magnetic permeability is as close to the magnetic permeability constant of about $1.257 \times 10^{-6}$ H/m in free space or vacuum, as possible.

The substrate may be a soft magnetic material such as electrical steel. The electrical steel may be a silicon steel. The silicon steel has a relatively high silicon content of about 0.1 to 7 wt. %, 2.5 to 4 wt. %, or 3 to 3.5 wt. %. The steel may also or alternatively contain manganese, aluminum or both in the amount of about 0.1 to 0.5 wt. %. The steel may be a grain-oriented silicon steel having a strong crystallographic orientation. The steel may be a non-oriented steel. The steel may be semi-processed or fully processed electrical steel. The substrate is a unitary substrate or a single substrate such that only a single type of material or composition defines the substrate, e.g. the entire substrate consists of electrical steel prior to modification described herein.

The substrate may be coated to provide electrical insulation, corrosion resistance, the coating may act as a lubricant during die cutting, the like, or a combination thereof. The coating may be organic or inorganic. The coating may be applied by chemical and/or thermal processes. The substrate may have an insulating coating. Alternatively, the substrate may be free of a coating material. The method may include removing any coating prior to the local tuning of magnetic permeability. The removing may be done chemically, for example by using one or more solvents, or mechanically, for example by grinding.

The substrate may be supplied as a coil or a sheet. The method may include die punching/cutting core laminations from the coil or sheet. Alternatively, the substrate may be supplied as die punched laminations. The lamination may be a rotor or a stator lamination. The thickness of each lamination may be about 0.1 to 1 mm or 0.3 to 0.7 mm. Two or more laminations may be stacked to form a rotor or stator core.

The method may include shielding a first region of the lamination while selectively applying at least one non-ferrous element to a second region of the sheet. The second region of the lamination is not shielded. The shielding may be provided by using a mask. The at least one non-ferrous element includes one or more elements from Period 4, 5, or both. Non-limiting examples of the at least one element include manganese, nickel, chromium, molybdenum, or an alloy thereof. The second region may include more than one portions. Each portion may be doped with a different element or a set of elements from Period 4, 5, or both. Alternatively, the same element or an alloy of elements may be applied to each portion or at least two portions.

The at least one element stabilizes the second region of the substrate in the non-ferromagnetic austenite phase at room temperature. Thus, when the at least one element is added to the second region of the substrate after the substrate is heated to above the phase transition temperature at which the substrate undergoes phase transformation from α phase to γ phase, the second region to which the at least one element was added remains in the γ phase after cooling down to room temperature. The at least one element thus enables local suppression of magnetic permeability.

Besides the first and second regions, the lamination may include additional areas which are not part of the first or second regions. For example, the lamination may include inserts or vacant areas that are not the first or second regions. For example, voids are used in the art to prevent permanent magnet flux leakage and are not second regions because they are not part of the lamination or singular substrate. The modification methods and apparatuses formed by such methods as described herein are applied to a single substrate and only a single material composition is used for the substrate.

In an alternative embodiment, the lamination does not undergo a phase transformation. Instead, the magnetic permeability may be reduced in the second region by forming a non-ferromagnetic or low magnetic permeability alloy. Low magnetic permeability relates to magnetic permeability lower than magnetic permeability of the first region. Formation of the alloy is induced by applying at least one element on the second region of the substrate. The at least one non-ferrous element includes one or more elements from Period 2, 3, or 4. Non-limiting examples of the at least one element include manganese, aluminum, silicon, carbon, sulfur, germanium, nickel, chromium, or an alloy thereof. Shielding, as described above, may be used to prevent application of the at least one element on the first region.

The adding or applying of the at least one element on the second region of the substrate surface may be performed by a number of different methods. For example, the at least one element may be applied as a molten metal or as a salt bath that contains the at least one element. Alternatively, the at least one element may be applied as a slurry of a powder including the at least one element which is subsequently sintered to produce a coating of the at least one element on the substrate. The at least one element may be alternatively applied by chemical vapor deposition via a gaseous or vaporized compound including the at least one element. Additionally, the at least one element may be applied by thermal spray of melted, atomized material including the at least one element. Alternatively still, the at least one element may be applied by physical vapor deposition or by a 3-D printing process. The same or different methods may be used for application of the at least one element onto different portions of the second region.

To apply the coating, a high precision method may be used such that a mask is not required to shield the first region. A high precision method may be one or more methods named above such as 3-D printing or a method utilizing an adjustable beam capable of delivering the at least one element onto a small area. Thus, local suppression of magnetic permeability at a small scale may be achieved. Alternatively, one or more masks may be applied to cover the first region and prevent the coating from being applied onto the first region.

The at least one element is subsequently diffused into the second region of the substrate. The diffusion may be provided by subjecting the second region, or the entire substrate, to an elevated temperature. The heating may be provided in a protective environment of an inert gas such as $N_2$, $H_2$, He, Ar, Xe, Kr, or a mixture thereof, or in a vacuum. The value of the elevated temperature may differ depending on the desirable result. For example, the elevated temperature may be different when the process utilizes phase transformation than when the process utilizes formation of a non-ferromagnetic or low permeability alloy. The elevated temperature may be the phase transition temperature of the substrate material when phase transformation is desirable. The elevated temperature may be at least the phase transition temperature or be higher or lower than the phase transition temperature of the substrate material in that case. Alternatively, the elevated temperature depends on a diffusion constant of the element when a non-ferromagnetic or low magnetic permeability alloy is to be formed in the second region of the substrate. The elevated temperature may be about 500 to 1600° C., 600 to 1500° C., or 700 to 1400° C. The diffusion of the at least one element may stabilize the non-ferromagnetic austenitic structure of the substrate such that the second region does not undergo another phase transformation to the ferromagnetic phase after the lamination is subsequently cooled to a temperature lower than the phase transition temperature such as the room temperature. Alternatively, the at least one diffused element may combine with the substrate and form a new non-ferromagnetic or low permeability alloy at the elevated temperature as a result of the heating to the elevated temperature.

A conventional furnace or induction heating may be used to globally heat the lamination. Alternatively, local induction heating, laser annealing, or both may be used to locally heat the lamination. The entire lamination may be subjected to heating. Alternatively, only a portion may be subjected to heating. For example, heating is applied to only one side of the lamination. In one or more embodiments, local heating may be used to selectively heat the region at which the phase transformation to the γ phase is desirable. For example, local heating may be used only at the second region while the first region is kept at a lower temperature than the elevated temperature such as a room temperature. To prevent heating of the first region, the first region may be shielded by a mask. Alternatively, localized heating may be such that the material in the first region is kept at a constant temperature while the second region is heated to an elevated temperature such as the phase transition temperature to initiate the phase transformation.

During the heating process, the heating rate should be optimized to minimize deformation of the lamination and its regions. The heating process may be combined with quality annealing which is used to fully develop magnetic properties of the substrate.

In a yet alternative embodiment, the second region of the lamination may be altered by application of oxygen, carbon, nitrogen, or a combination thereof onto the second region. The application may be provided by ion implantation. The ion implantation may be performed by an ion implantation instrument. The remaining steps are similar to the process described above. For example, a mask may be used to shield the first region such that the un-shielded second region may form non-ferromagnetic alloys. Alternatively, the ion instrument may be capable of precisely focusing the ion implantation beam such that the instrument may be set to affect only a selected area of the lamination without affecting surrounding regions of the lamination. Thus, the method may not require shielding of the first region.

The ion implantation results in formation of non-ferromagnetic oxides, carbides, nitrides, or a combination thereof in the second region of the lamination. Post ion implantation, the method may include annealing to restore the implantation-caused crystallographic damage, to diffuse the doping element(s) deeper into the substrate, or both.

Subsequently, after the modification of the second region as described above, a coating may be applied onto the first region, second region, or both to provide protection from corrosion, provide insulation, the like, or a combination thereof. The coating may be applied only to the areas from which the original coating was removed. The coating may be uniform or non-uniform in its chemical composition and/or dimensions. The coating may be applied after the heating to an elevated temperature. The coating may be applied at a room temperature after the lamination cools down.

The altered laminations may be then stacked together to build rotor or stator cores, inductor cores, transformers, etc. In an alternative embodiment, the laminations may be stacked prior to application of the at least one element and prior to heating. In some embodiments, the laminations may be stacked even prior to removing the initial coating. If portions of the initial coating are retained on the laminations, the type of initial coating should be capable of withstanding the elevated temperature. All or only some of the laminations forming a core may include second regions. The second regions on different laminations of the same core may include the same or different doping element or elements.

While the application of the at least one element may be performed on a lamination, the same process may be provided before laminations are stamped from the electrical steel. Thus, the process is applicable to the steel sheet or coil. In some embodiments, the location of the first and second regions may be identified in the electrical steel coil or sheet prior to stamping. The at least one element is then applied onto the second region as was described above. The lamination is then stamped. Subsequently, the heating to the elevated temperature, cooling to a lower temperature, and providing a coating is performed as was described above. Alternatively, the entire process including identifying the first and second regions, removing the initial coating, if present, applying the at least one element onto the second region, the heating, the cooling, and applying a coating may be provided prior to stamping.

The first region, the second region, or both may include one or more portions. The portions may be discreet portions which are not in contact with each other. The shape, dimension, and configuration of individual portions may differ or be the same. Non-limiting examples of the laminations having first and second regions are depicted in the FIGS. 1-11. The shape of the first and second regions is identified, determined, and provided to control the flow of the magnetic flux through the lamination, to eliminate known and undesired fluxes, redirect those fluxes fruitfully, or a combination thereof. Each lamination has a first side and a second side. The process described herein is applicable on either or both sides. The process described herein is also applicable on the edges of laminations or assembled lamination cores. Magnetic permeability of the second regions may be adjusted either on both sides at the same time or on the first or second side first and then on the complimentary side at a later time. Each lamination may have one or more sections. Each section includes a first region and a second region. Multiple discreet sections may include the same or different pattern of the first and second regions. The same or different method embodiments described above may be used to adjust the second regions of different sections, laminations, sides, or cores. For example, the phase transformation method may be used to modify magnetic permeability in a first section, the ion doping may be used in a second section, and the formation of non-ferromagnetic or low permeability alloys may be used in a third section of one side of a lamination.

A non-limiting example of a core lamination, a rotor lamination 100, is shown in FIGS. 1A and 1B. The rotor lamination 100 may be stacked with other laminations 100 to form a rotor 10. The laminations 100 may have the same or different layouts. The depicted lamination 100 has eight sections 120, a detailed view of one being depicted in FIG. 2. The rotor may rotate about a central axis 12. The lamination 100 may have a pole pitch defining the magnetic poles 104, 106. For an eight-pole machine, the pole pitch is 45°. The poles 104, 106 may alternate between external north poles 104 and external south poles 106. The poles may be formed by permanent magnets 110 situated in pockets 108. The pockets may be arranged in V-shaped magnet pairs to define the magnetic poles 104, 106. The lamination 100 defines an inner hole 20 sized to receive a drive shaft (not depicted). The inner hole 20 may include drive keys 22 to receive and lock the drive shaft in place.

Figure 2:
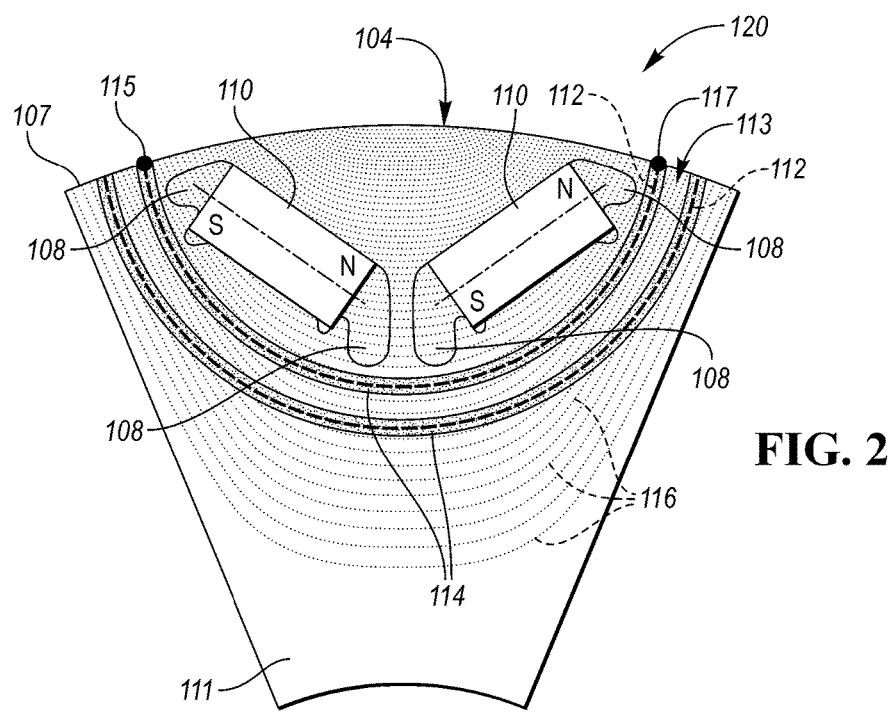
FIG. 2 is an example rotor section having an arc-shaped second region.

Referring to FIG. 2, a section 120 of a rotor lamination 100 is shown. The rotor lamination 100 includes permanent magnets 110 situated in pockets 108 to form magnetic pole 104. The pockets 108 have a V-shaped configuration, but other configurations are contemplated. The permanent magnets 110 create direct axis flux that emanates the north and south poles of permanent magnets 110 and is perpendicular to quadrature axis flux lines 116 generated by the stator (not shown). The rotor lamination 100, or at least the depicted section, is unitary. In other words, the lamination 100 is formed from a single substrate and is substantially comprised of one material such as an electrical steel, as was discussed above. Aside from the permanent magnets being nested within the rotor 10, the lamination 100 is a unitary piece formed of a single substrate material such as the electrical steel. The permanent magnets 110 may be any type of magnet (e.g., rare-earth, ferrite).

The unitary lamination 100 has a first region 111 configured to house the permanent magnets 110 and a second region 114. The second region 114 is modified by the process described above to be non-ferromagnetic or have low magnetic permeability. Just as the first region 111, the second region 114 may have various shapes, forms, and configurations. A non-limiting example of the second region 114 is depicted in FIG. 2. The second region 114 may be defined by one or more arcuate shapes 112, which may extend between two locations on the outer periphery 107 of the rotor lamination 100. The second region 114 may have multiple layers, rows, bands, lines, or the like.

One or more channels 113 may be formed by the second region 114 to direct magnetic flux to the outer periphery 107 of the lamination 100. Each channel 113 may be defined by two discreet rows 112 of the second region 114. The permeability of the first region 111 is equal to the permeability of the substrate material. The magnetic permeability of the second region 114 is lower than magnetic permeability of the first region 111. The reduced permeability of the second region 114 reduces the d-axis fluxes generated by the current in the stator winding and contained by the first region 211.

The second region 114 is oriented such that the second region 114 impedes direct axis flux generated by the current in the stator winding and contained by the first region 111. The second region 114 may also impede the flux generated by the magnet, which is counterproductive. The second region 114 extends from one point 115 on the outer periphery 107 to another point 117 on the outer periphery 107, enclosing the V-shaped permanent magnets 110 between the outer periphery 107 and the second region 114.

The direct axis ("d-axis") and quadrature axis ("q-axis") magnetic fields describe the magnetic flux of the rotor 10. Fields emanating directly from the salient pole 104 are called the direct axis. Fields emanating perpendicular to the salient pole 104 are called the quadrature axis. The direct axis extends from a pole 104, north or south, from the permanent magnets 110 to the outer periphery 107 of the lamination 100. The quadrature axis extends from the junction of the north and south poles of each individual magnet 110, as shown by field lines 116.

Figure 3:
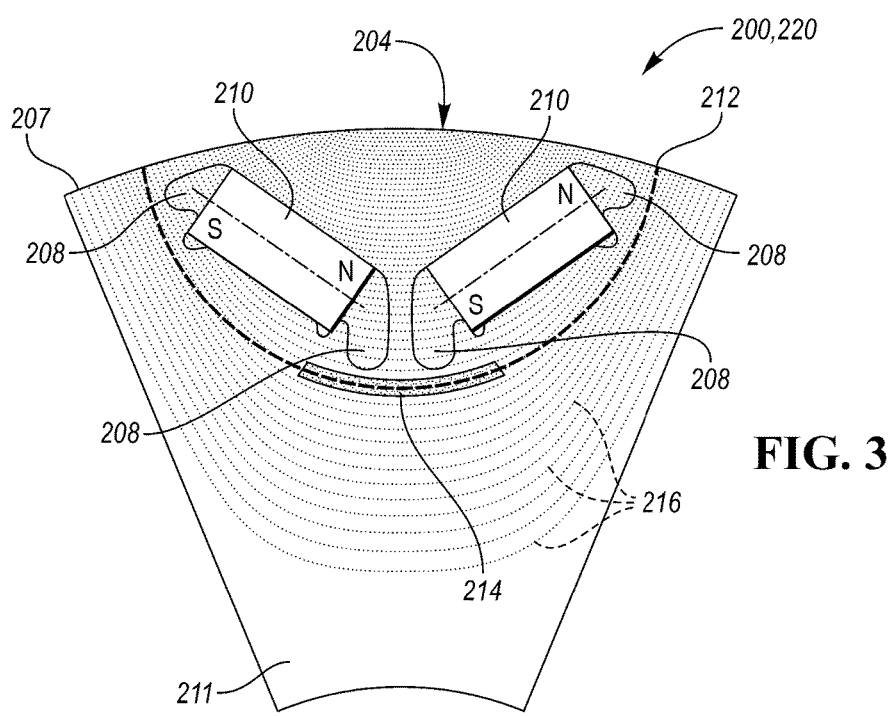
FIG. 3 is another example rotor section having a reduced arc-shaped second region.

Another non-limiting example of a section 220 of a lamination 200 is depicted in FIG. 3. The unitary rotor lamination 200 includes permanent magnets 210 situated in pockets 208 to form magnetic pole 204. The pockets have a V-shaped configuration. The permanent magnets 210 create direct axis flux that emanates the north and south poles of permanent magnets 210 and is perpendicular to quadrature axis flux lines 216. Aside from the permanent magnets being nested within the rotor 10, the rotor lamination 200 is a unitary piece formed of a single substrate material prior to the modification described herein. The unitary lamination 200 has a first region 211 configured to house the permanent magnets 210 and the second region 214. The modified second region 214 may be defined by an arcuate shape 212 or a portion thereof, which extends between two locations on the outer periphery 207 of the rotor lamination 200. While just one row is depicted in FIG. 3, the second region 214 may have additional row or rows. The second region 214 is shown substantially between the central axis 12 and the outer periphery 207. The magnetic permeability of the second region 214 is lower than magnetic permeability of the first region 211. The second region 214 is oriented such that the second region 214 impedes direct axis flux generated by the current in the stator winding and contained by the first region 211.

Figure 4:
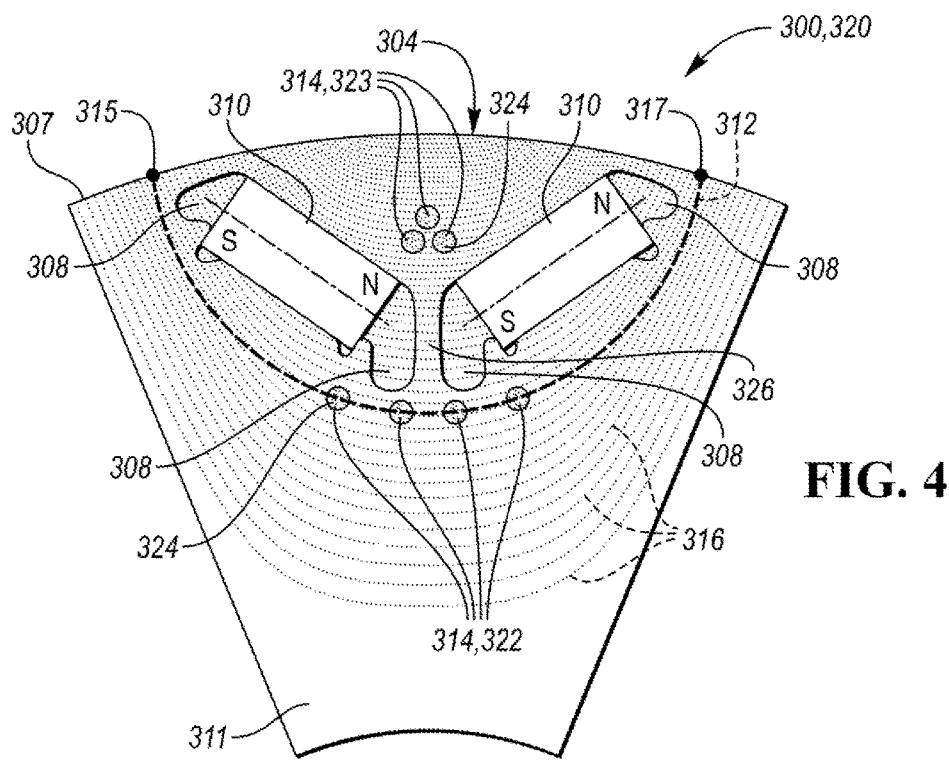
FIG. 4 is an example rotor section having discreet areas of the second region.

Similarly to FIGS. 2 and 3, FIG. 4 depicts yet another section 320 of a unitary lamination 300. The rotor lamination 300 includes permanent magnets 310 situated in pockets 308 to form magnetic pole 304. The pockets have a V-shaped configuration. The permanent magnets 310 create direct axis flux that emanates the north and south poles of permanent magnets 310 and is perpendicular to quadrature axis flux lines 316. The lamination 300 has a first region 311 configured to house the permanent magnets 310 and a second region 314. The second region 314 includes discreet portions 322 and 323. The portion 322 includes multiple round-shaped areas 324 about the arcuate shape 312. The portion 322 may include one or more of the areas 324 anywhere between points 315 and 317 on the outer periphery of the lamination 300. More than one arcuate shape 312 may be present. More than one arcuate shape 312 may include the portion 322. Some portions of the second region 314 may reside on different arcuate shapes 312 to limit flux perpendicular to the quadrature axis field lines 316.

The portion 323 in FIG. 4 shows a set of three areas 324 located between the pockets 308 and between the bridge 326 defined by the pockets 308 and the outer periphery 307 of the lamination 300. The portion 323 is defined or disposed between the V-shaped pair of permanent magnets 310. The portion 323 has three areas 324 in a triangle configuration, as shown, to impede direct axis flux generated by the current in the stator winding.

The shape of the individual areas and the configuration of the areas is not limited to the depicted embodiment. While each depicted area 324 in the portions 322 and 323 is circular, each portion or area may have any shape and together, the areas may form a configuration of any shape. For example, the area, portion, or configuration may be circular, semi-circular, oval, semi-oval, triangular, rectangular, square, diamond, knob-like, regular, irregular, symmetrical, asymmetrical, the like, or a combination thereof. An area within each portion may have the same or different shape as the remaining portions. The areas may form irregular or regular patterns of areas within one portion. An area may have one or more corners or angles. The second region may be linear. Similarly, dimensions and/or chemical composition may be the same or different in discreet portions and/or areas of the second region.

Besides the portions 322 and 323, or instead of portions 322 and 323, another portion may be included on the lamination. Each portion may include one or more areas. For example, each portion may include the same or different number of areas. The number of areas within one portion may be 1 to 20, 2 to 10, or 3 to 5.

Figure 5:
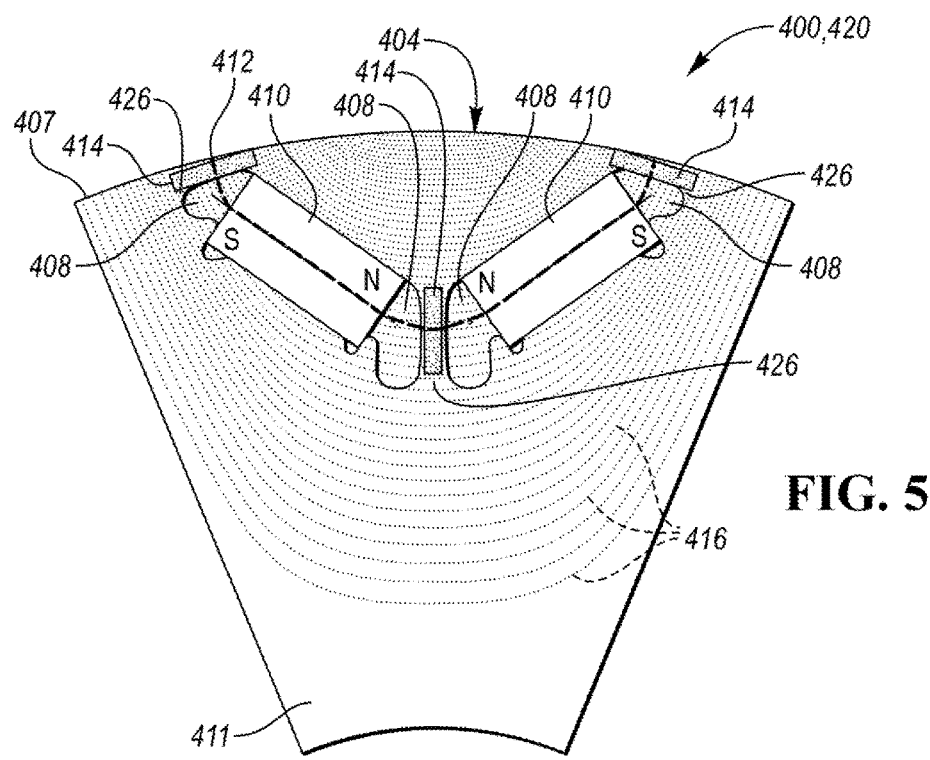
FIG. 5 is an alternative example rotor section, representative quadrature axis field lines, and a second region defined on bridges of the rotor section.

Yet another non-limiting example of the second region is depicted in FIG. 5. FIG. 5 shows a section 420 of a lamination 400. The rotor lamination 400 includes a first region 411 and a modified second region 414. The second region 414 is oriented such that the second region 414 impedes direct axis flux generated by the current in the stator winding and contained by the first region 411. The second region 414 is located on center, top, or other bridges 426 associated with the permanent magnets 410 and pockets 408. The second region 414 may form only a portion of the bridge 426. Some bridges 426 may be a part of the second region 414 while other bridges may be a part of the first region 411 and remain unaltered.

Figure 6A:
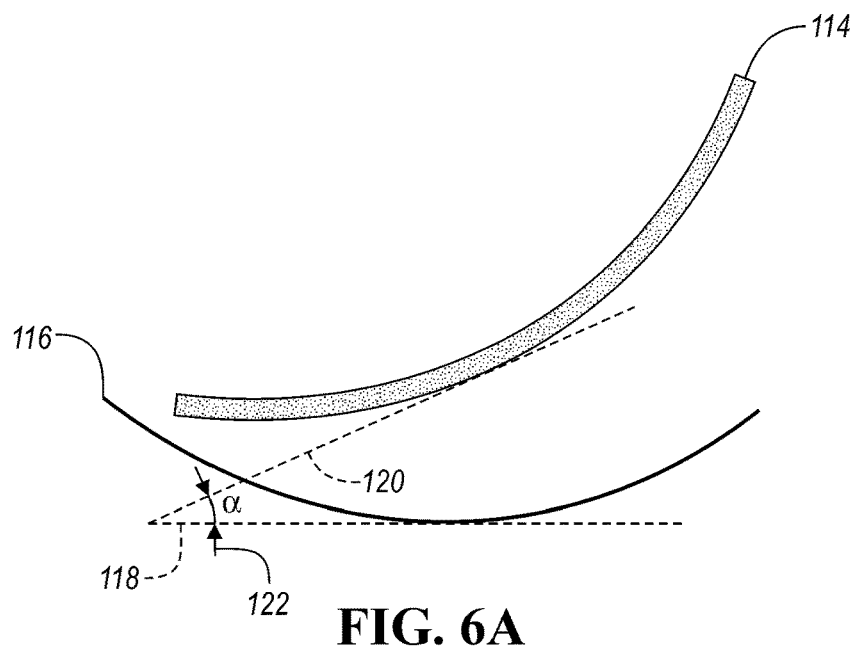
FIG. 6A is an example arc-shaped second region offset from a quadrature axis flux line.
Figure 6B:
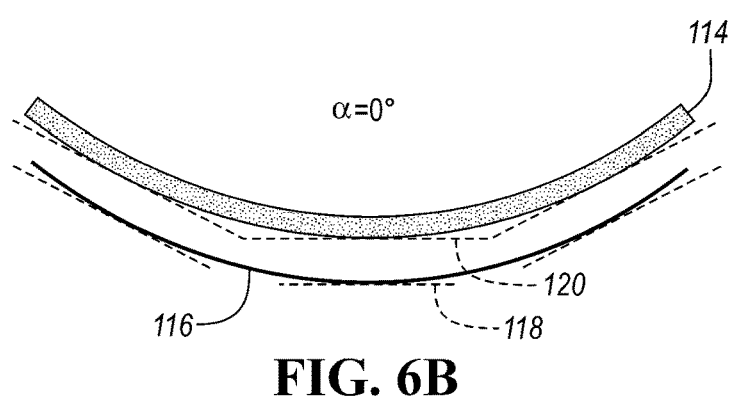
FIG. 6B is another example arc-shaped second region superimposed on a quadrature axis flux line.
Figure 6C:
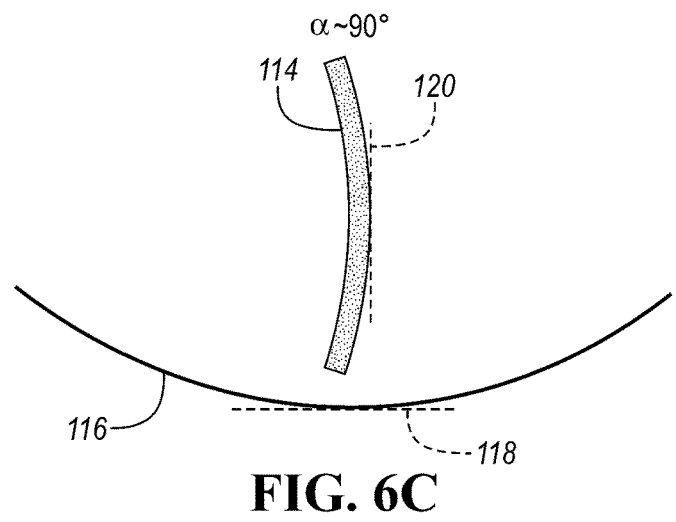
FIG. 6C is a yet another example arc-shaped second region substantially perpendicular to a quadrature axis flux line.

Referring to FIGS. 6A-C, a quadrature axis current flux line 116 is shown. The second region 114 or arcuate shape is shown having a tangent line 120 being offset at an angle, a, 122 from a line 118 tangent to the flux line 116. At a corresponding distance from an intersection line, the second region 114 or arcuate shape 112 may be angled to provide a different flux channel shape. The angle may be driven by a relative position of the permanent magnets 110. The angle 122 may be preferably between ±45°. The angle 122 may be most preferably be set to zero, making the second region 114 parallel to the quadrature axis flux lines generated by the stator. In another embodiment, the angle 118 may be ±90° or perpendicular to the quadrature axis flux lines 122.

Figure 7:
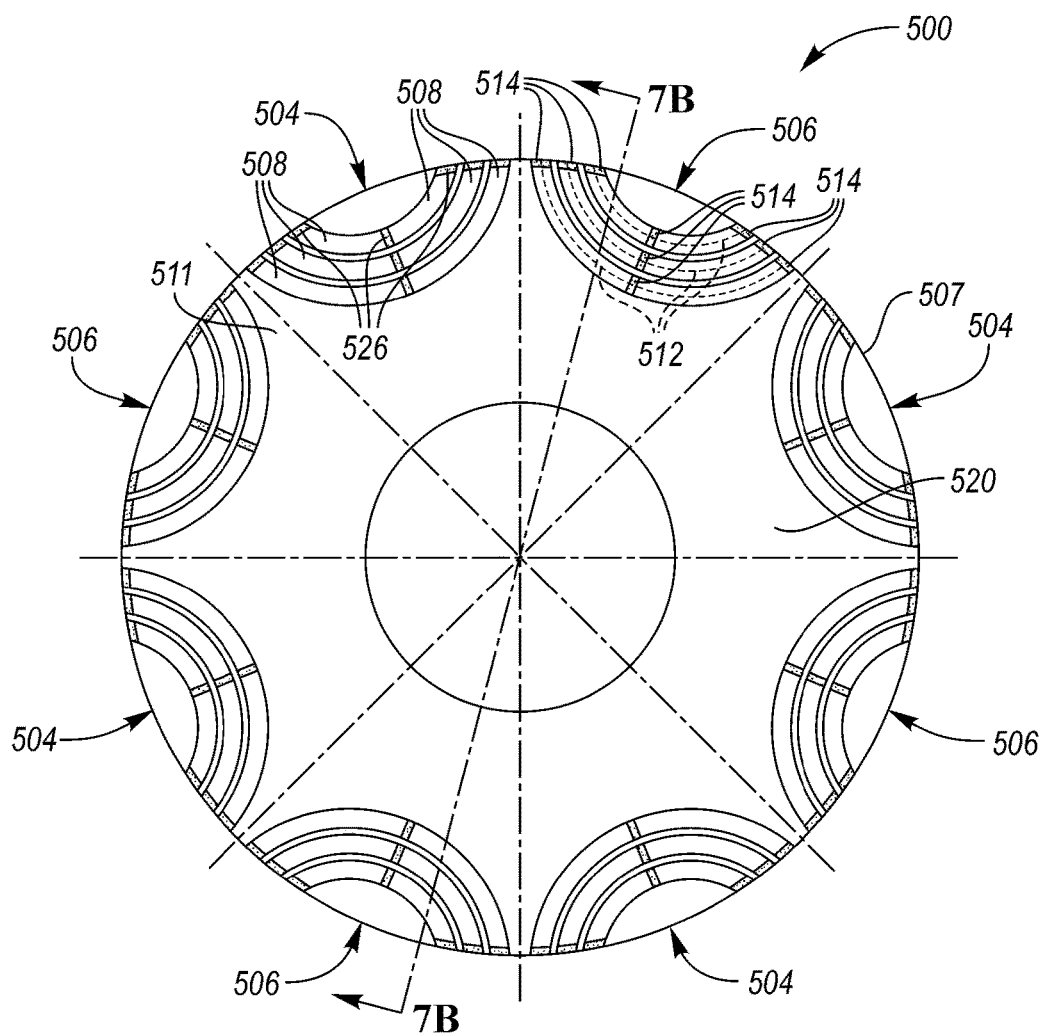
FIG. 7 is a plan view of an example reluctance rotor.

An alternative lamination 500 of a reluctance rotor is shown in FIG. 7. The lamination 500 has alternating magnetic poles 504, 506. The poles are defined by a plurality of flux barriers 508 having a particular shape configured to generate torque through a difference between d-axis and q-axis magnetic flux. The rotor lamination 500 has a first region 511 with a predefined magnetic permeability. The flux barriers 508 may define a plurality of bridges 526 for mechanical support of the rotor lamination 500. The bridges 526 may partially define a second region 514 having a different magnetic permeability than the first region 511. The entire lamination 500 is made from a unitary composition with the second regions 514 being modified to alter its magnetic permeability. Portions of the second region 514 may be defined by an arcuate shape 512. The arcuate shape 512 may be defined by the flux barriers 508, which also define the support bridges 526. The lamination 500 may have an inner diameter 520 for receiving a drive shaft.

Figure 8:
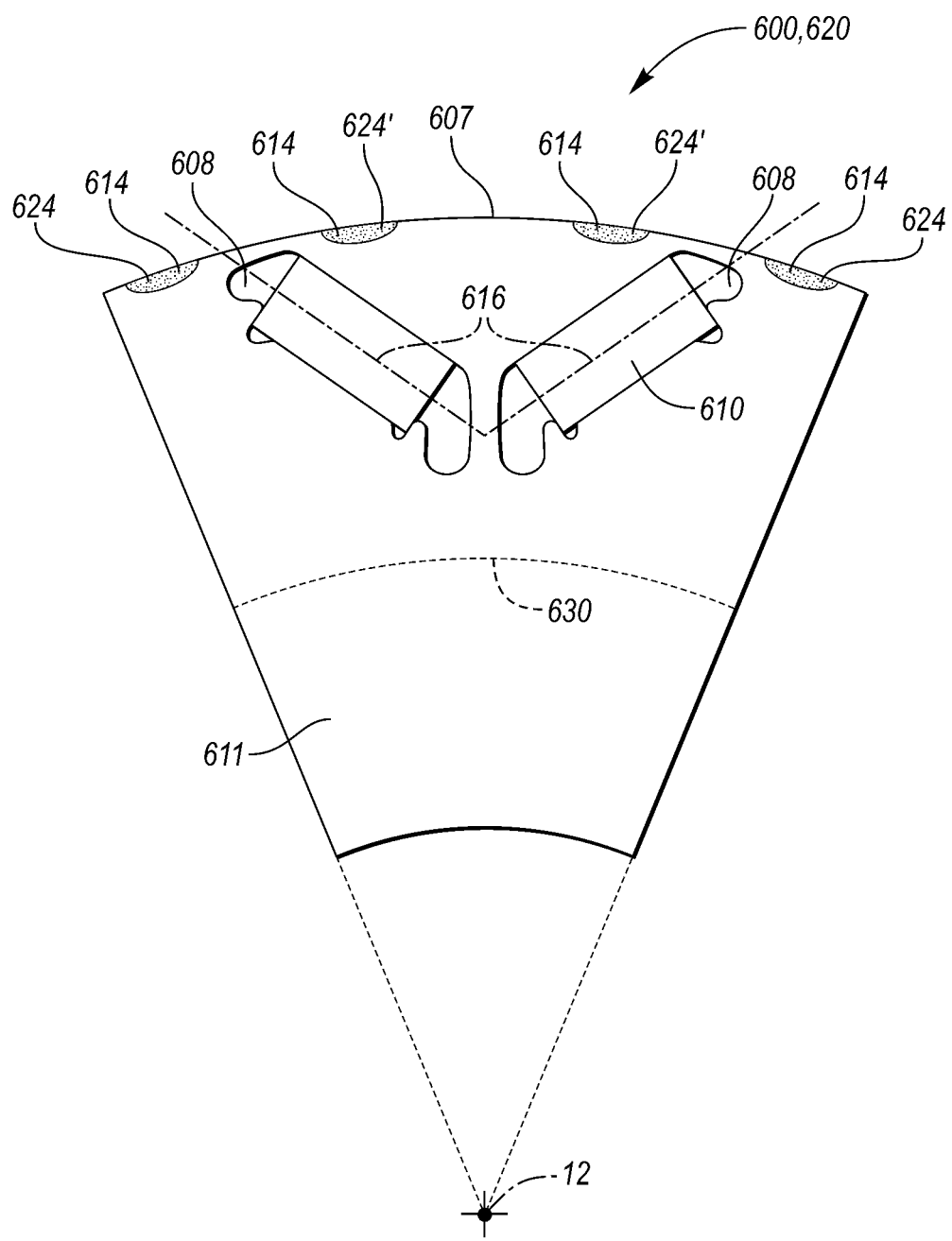
FIG. 8 is an example rotor section having semi-ovoid areas of the second region.
Figure 9:
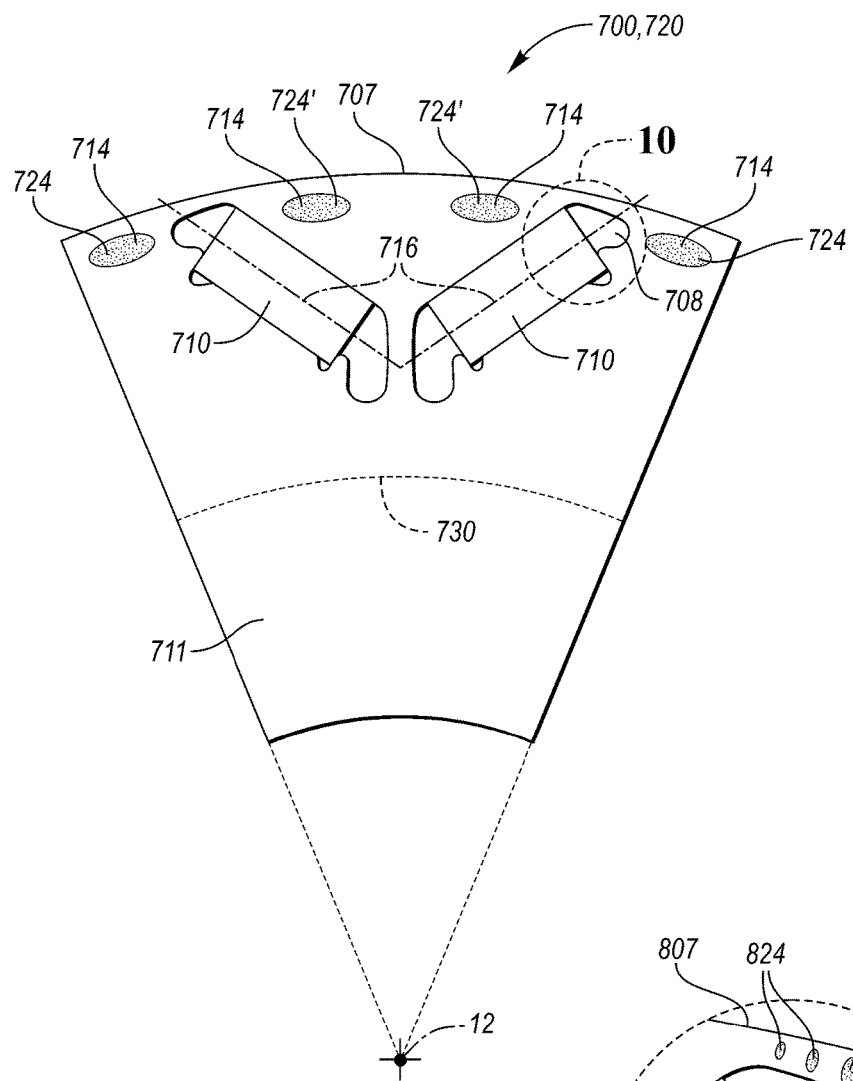
FIG. 9 is another example rotor section having oval areas of the second region.

FIGS. 8 and 9 depict alternative sections 620 and 720 of rotors 600 and 700. The laminations 600, 700 include a first region 611, 711 defining pockets 608, 708 for retaining permanent magnets 610, 710, and a second region 614, 714. The pockets 608, 708 have a V-shape to form legs 616, 716. The second region 614, 714 is defined between the legs 616, 716 of the pockets 608, 708. The second region 614, 714 has multiple areas located between the legs 616, 716. The areas may be located above a midline 630, 730 of the lamination 600, 700, which is between the central axis 12 and the outer periphery 607, 707. The depicted, and optionally additional, areas 624 may be used to improve $24^{th}$ harmonic response of the rotor 600, 700 by reducing torque ripple when the second region 614, 714 is disposed or defined between the legs 616, 716 of adjacent V-shaped pockets 608, 708 of two adjacent sections 620, 720. The individual areas 624', 724' of the second region 614, 714 may also be disposed between legs 616, 716 of one of the V-shaped magnet pockets 608, 708 to improve harmonic responses related to the $48^{th}$ harmonic of the rotor. Therefore, as shown, the second region 614, 714 may include four distinct semi-ovoid and oval areas 624, 624', 724, 724', respectively, disposed on and/or adjacent to the outer periphery 607, 707, reducing the $24^{th}$ and $48^{th}$ harmonic responses of the rotor 600, 700.

Figure 10:
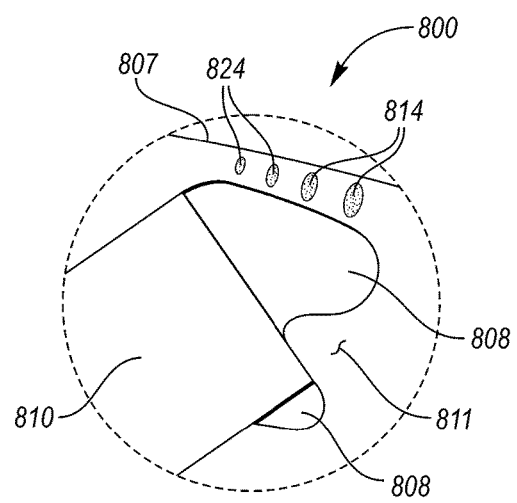
FIG. 10 is an example rotor section having a second region defined between a permanent magnet pocket and the outer periphery of the rotor.

Non-limiting examples of additional second region areas 824 are depicted in FIG. 10. While the size of the individual areas 824 differs, their respective shapes are the same. The areas of the second region 814 are located between the outer periphery 807 of the lamination 800 and the upper portion of the pocket 808. The first region 811 surrounds the areas of the second region 814.

Figure 11:
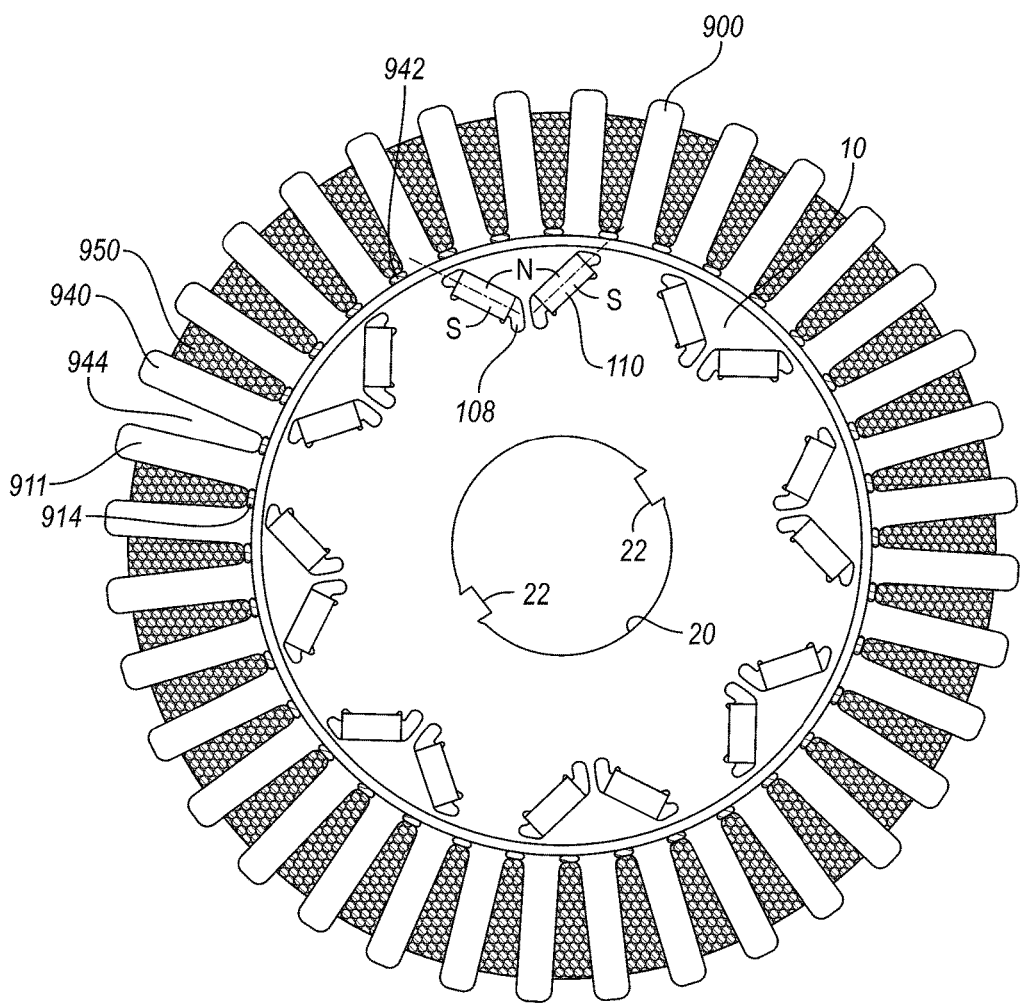
FIG. 11 depicts example stator and rotor laminations, the stator lamination having a second region defined on bridges between elongated members.

As was discussed previously, the method of locally modifying magnetic permeability of the second region of a lamination is likewise applicable to stator cores. The stator cores may include one or more laminations modified according to the process described herein. As is depicted in FIG. 11, a non-limiting example of a stator lamination 900 is shown surrounding an exemplary rotor 10 lamination from FIG. 1A. The stator lamination 900 has a first region 911 defined by longitudinal members 940. Adjacent individual longitudinal members 940 are connected to each other via a base 942 including a bridge. A slot, void, or an opening 944 exists between adjacent longitudinal members 940. Each void may be filled with a winding 950. The stator lamination 900 includes a second region 914. The second region 914 may include a plurality of portions located at the base 942 of the longitudinal members 940 and between adjacent longitudinal members 940, separating two adjacent first regions 911. The second region 914 may have any shape and dimensions as was discussed above. The second region 914 may have a shape of a bridge between adjacent first regions 911. The location, shape, configuration, and the like of the second region 914 should be such as to lead the magnetic flux produced from the stator to the rotor and back to the stator.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A core lamination comprising:
    a first region defined by a ferromagnetic electrical steel substrate having a predefined magnetic permeability; and
    a second region having a lower magnetic permeability than the first region, the second region defined by the substrate selectively overcoated with at least one non-ferrous element from Period 2-5, or a combination thereof.

2. The lamination of claim 1, wherein the substrate in the second region includes a non-ferromagnetic austenite phase of the electrical steel.

3. The lamination of claim 2, wherein the at least one non-ferrous element from Period 2, 3, 4 is diffused into the non-ferromagnetic austenite phase to stabilize the non-ferromagnetic phase.

4. The lamination of claim 1, wherein the at least one non-ferrous element forms an alloy with the substrate in the second region.

5. The lamination of claim 1, wherein the second region comprises manganese, nickel, aluminum, silicon, carbon, sulfur, germanium, chromium, molybdenum, or an alloy thereof.

6. The lamination of claim 1, wherein the at least one non-ferrous element forms non-ferromagnetic oxides, carbides, or nitrides in the second region.

7. The lamination of claim 1, wherein the lamination is a rotor lamination, stator lamination, inductor lamination, or a transformer lamination.

8. A method of adjusting magnetic permeability of a core lamination, the method comprising:
   inducing a phase transformation of an electrical steel lamination having a predefined magnetic permeability to generate a non-ferromagnetic austenite phase;
   shielding a first region of the lamination while selectively applying at least one non-ferrous element from Period 4, 5, or both to a second region of the lamination; and
   diffusing the at least one element into the second region of the lamination such that the second region stabilizes in the non-ferromagnetic austenite phase while the first region regains its ferromagnetic properties after the lamination is cooled to a room temperature.

9. The method of claim 8, wherein the second region comprises manganese, nickel, chromium, molybdenum, or an alloy thereof.

10. The method of claim 8 further comprising applying the at least one non-ferrous element from Period 4, 5, or both on the lamination surface before diffusing the at least one element into the second region.

11. The method of claim 8, wherein the second region comprises at least two discreet portions, each portion having the same shape, dimensions, or both.

12. The method of claim 8 further comprising applying an insulation coating over the first and second regions.

13. A method of suppressing magnetic permeability of a core lamination, the method comprising:
    shielding a first region of the lamination while selectively applying at least one non-ferrous element from Period 2, 3, or 4 to a second region of the lamination; and
    diffusing the at least one element into the second region such that a substrate of the lamination forms and maintains a material, having lower magnetic permeability than the first region, with the at least one non-ferrous element in the second region.

14. The method of claim 13, wherein the second region comprises manganese, nickel, aluminum, silicon, carbon, sulfur, germanium, chromium, or an alloy thereof.

15. The method of claim 13, wherein the material is an oxide, carbide, nitrite, or an alloy.

16. The method of claim 13 further comprising ion-implanting the at least one element into the second region.

17. The method of claim 13, wherein the second region defines one or more flux barriers of a rotor or stator core lamination.

18. A method of adjusting magnetic permeability of an electrical steel sheet or coil, the method comprising:
    shielding a first region of the steel sheet or coil while selectively applying at least one non-ferrous element from Period 2-5 to a second region of the steel sheet or coil, the first and second regions having a same predetermined magnetic permeability; and
    diffusing the at least one element into the second region such that the magnetic permeability of the second region is lowered and the second region maintains the lower magnetic permeability than the first region.

19. The method of claim 18 further comprising inducing a phase transformation of the second region to generate and maintain a non-ferromagnetic austenite phase in the second region while maintaining a ferromagnetic phase in the first region.

20. The method of claim 18 further comprising forming an alloy with the at least one non-ferrous element in the second region, the alloy having a lower magnetic permeability than the predetermined magnetic permeability.

* * * * *